United States Patent [19]
Rogora et al.

[11] 3,971,958
[45] July 27, 1976

[54] PULSE GENERATOR FOR PROVIDING INFORMATION AS TO THE RATE OF ROTATION AND PHASING OF AN ENGINE TO AN ELECTRONIC APPARATUS INTENDED TO GOVERN THE FUEL FEED TO AN INTERNAL COMBUSTION ENGINE OF THE FUEL INJECTION TYPE

[75] Inventors: Edoardo Rogora; Walter Giraudi, both of Milan, Italy

[73] Assignee: Alfa Romeo S.p.A., Milan, Italy

[22] Filed: Mar. 26, 1974

[21] Appl. No.: 454,937

Related U.S. Application Data

[63] Continuation-in-part of Ser. No. 387,637, Aug. 13, 1973, abandoned, which is a continuation of Ser. No. 225,228, Feb. 10, 1972.

[30] Foreign Application Priority Data
Feb. 20, 1974  Italy.................................. 48585/74

[52] U.S. Cl................................ 307/106; 338/32 H
[51] Int. Cl.².......................................... H03K 3/00
[58] Field of Search................. 310/DIG. 3, DIG. 4; 338/32 R, 32 H; 307/106

[56] References Cited
UNITED STATES PATENTS
| | | | |
|---|---|---|---|
| 2,924,633 | 2/1960 | Sichling et al. | 338/32 H |
| 3,818,326 | 6/1974 | Masuda et al. | 338/32 R |

*Primary Examiner*—David Smith, Jr.
*Attorney, Agent, or Firm*—Holman & Stern

[57] ABSTRACT

A pulse generator is disclosed, intended to supply information as to the speed of rotation and the phasing of an internal combustion engine of the injection type, said generator comprising at least a magnetosensitive switching device formed by a magnetoresistive element positioned at a preselected location along a circumference, means for producing a magnetic field for switching said magnetosensitive switching device mechanically connected to the main shaft so as to be rotated at a speed proportional to the speed of rotation of the engine and with a preselected phase relationship with respect thereto, said magnetic field periodically influencing said switching device for a length of time and at a frequency which are a function of the engine speed of rotation and with a phase which is a function of the phase relationship aforementioned.

1 Claim, 6 Drawing Figures

PULSE GENERATOR FOR PROVIDING INFORMATION AS TO THE RATE OF ROTATION AND PHASING OF AN ENGINE TO AN ELECTRONIC APPARATUS INTENDED TO GOVERN THE FUEL FEED TO AN INTERNAL COMBUSTION ENGINE OF THE FUEL INJECTION TYPE

This is a continuation-in-part application of my prior patent application Ser. No. 387,637 filed on Aug. 13, 1973 now abandoned, which is a Rule 60 continuation application of my prior patent application Ser. No. 225,228 filed on Feb. 10, 1972.

This invention relates to a pulse generator for providing information as to the speed of rotation and phasing of an engine to an electronic apparatus intended to govern the fuel feed to an internal combustion engine of the injection type.

It is known that the internal combustion engines of the injection type, wherein the fuel feed takes place by injecting the fuel into the air intake duct, require specially provided apparatus for adjusting the amount of fuel which is injected every time and for attuning the injection with the phase angle of the cylinder which is concerned every time.

In the majority of the cases, these apparatus, which are ever more often of the electronic type, effect their governing action of the amount of fuel injected as a function of the speed of rotation of the engine and of another physical unit which can be selected between the negative pressure obtaining in the intake duct and the angle of the throttle butterfly valve. The synchronization of the injection with the phase angle of the cylinder concerned is carried out, conversely, on the basis of phase information which is appropriately gathered.

In the most commonly known electronic apparatus of this kind, the necessary information as to the speed of rotation and the phase angle are supplied by a pulse generator which is properly coupled to the main shaft so as to deliver one or more pulse trains, and in which the speed information is formed by the duration and/or the frequency of the pulses, whereas the phase information is usually formed by the position of the rising front of the pulses.

An object of the present invention is to provide a novel and improved pulse generator, which is able to provide the required information as to the speed of rotation and phase angle of an engine, to an electronic apparatus intended to govern the fuel feed to an internal combustion engine of the fuel injection type.

With this object in view, the pulse generator according to the invention comprises at least a magnetosensitive switching device formed by a magnetoresistive element, means for producing a magnetic field, for switching (high speed commutating from one level to another) said magnetosensitive switching device, mechanically connected to the mainshaft so as to be rotated at a speed which is proportional to that of the mainshaft and with a preselected phase relationship with respect to said mainshaft; said magnetic field periodically affecting said switching device and causing its temporary switching with a duration and a frequency which are a function of the speed of rotation of the engine shaft and with a phase relationship which is a function of the phase relationship aforementioned.

The pulse generator according to the present invention thus exploits the principle of controlling the periodical switching of an electric circuit by means of a magnetic field which is periodically applied to a magnetosensitive switching device formed by a magnetoresistive element. By causing the applicaton of such a magnetic field to have a duration and a frequency which are a function of the speed of rotation of the engine and in concordance with the phase angle of the engine, it thus becomes possible to obtain a pulse train in which the duration and/or the frequency of the pulses are the information as to the speed of rotation of the engine and the position of the rising front of the pulses is the phase information. The pulse train thus obtained has the outstanding advantage that it is deprived (from a strictly technical standpoint) of switching noises, a condition which is sometimes imperative in the case of governing apparatus to which the pulse generator according to this invention is intended to become associated.

Obviously, the number of magnetosensitive switching devices formed by magnetoresistive elements, which are comprised in the pulse generator according to this invention, may be varied according to the type of regulation apparatus adopted and, more particularly, as a function of the type of control of the injectors obtained thereby. A most common case is, for example, the one which provides the independent actuation, dephased in time, of the injectors associated to the several cylinders. In such a case, the pulse generator, obviously, is required to deliver as many wave trains dephased with respect to one another as there are cylinders in the engine. The pulse generator can be constructed by employing magnetosensitive switching devices formed by magnetoresistive elements of common or differential type: the first ones are bipolar components and comprise one magnetoresistor, whereas the second ones are tripolar components and comprise two magnetoresistors.

By employing magnetoresistive elements of common type to control the above mentioned injectors, as many magnetoresistive elements are necessary as the cylinders of the engine are; the signals delivered by the generator can be used directly in the regulation apparatus, but they are affected by the variation of temperature.

By employing magnetoresistive elements of differential type, on the contrary, a number of magnetoresistive elements is necessary equal to half of the number of the cylinders; the signals are not affected by the temperature, since a self-compensating effect results; however, it is necessary to use a decoding circuit connected to the pulse generator in order to allow the signals for sequentially controlling two engine cylinders to be obtained from the signal delivered by a magnetoresistive element.

Furthermore, by employing magnetoresistive elements of differential type, it is not only necessary that the switching magnetic field is rotating, but it is also necessary that the polarity of said field is cyclically inverted; on the contrary, in case of employing magnetoresistive elements of common type it is not necessary that the polarity of the magnetic field is inverted.

Lastly, it should be noticed that a pulse generator made up in this way can be used also for other devices which require information as to speed and phase (either simultaneously or individually), such as the devices for governing the angle of advance of firing, the firing and switching devices for the spark plugs, or an appropriate voltmetric instrument as an engine revolution counter.

The features and advantages of the present invention will become more fully apparent by an examination of the present detailed description of a few embodiments thereof as conceived for the application to a governing apparatus for an internal combustion engine of the injection type in which the injectors are individually controlled. In the following description, which is given by way of non limiting example only, reference will be had to the accompanying drawings, wherein.

Figure 1:
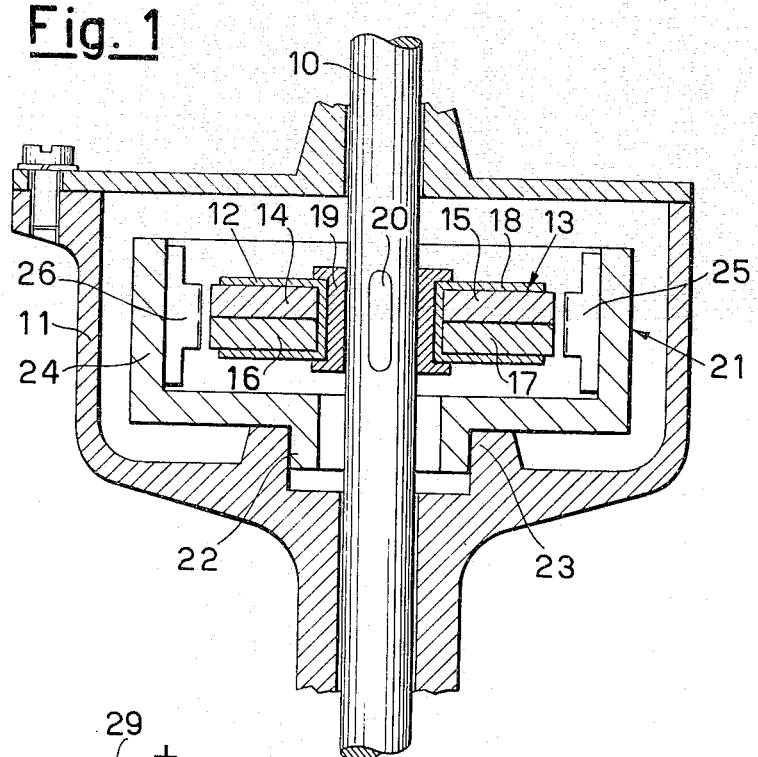
FIG. 1 shows a pulse generator formed by differential magnetoresistive elements for a four cylinder engine, the generator being shown as sectioned along two axial planes inclined of an angle less than 180° with respect to one another.
Figure 2:
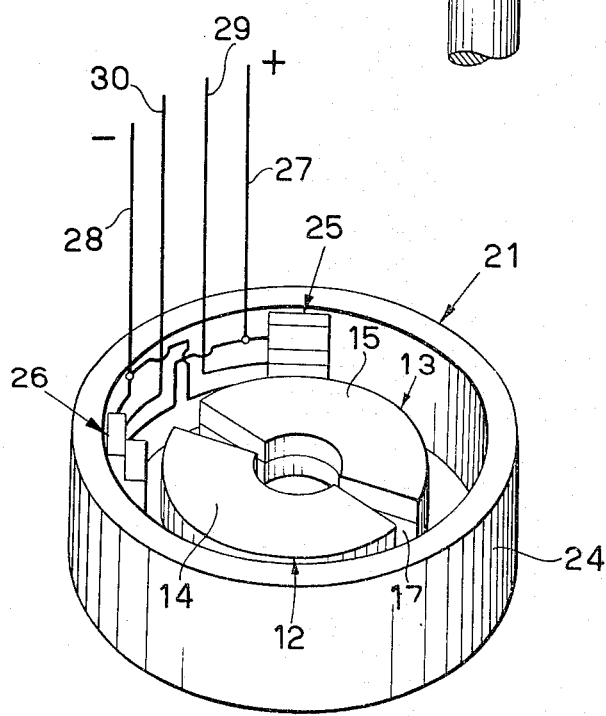
FIG. 2 is a perspective view showing the basic components of the generator.

The pulse generator shown in the drawings comprises a shaft 10 rotatably driven by the main shaft (not shown) of the vehicle engine, a casing 11 within which the shaft 10 is rotatably supported, and two permanent magnets 12 and 13. As appears from FIG. 2, the magnets 12 and 13 are shaped as two cylindrical sectors and are provided with pole pieces of suitable angular extension; the pole pieces of the magnet 12 are designated by the reference numbers 14 and 16 and the pole pieces of the magnet 13 are designated by the reference numbers 15 and 17.

The magnets are mounted on the cartridge 18 so as to have an opposite mode in the lying of the magnetic polarities and are made integral with the shaft 10 in a suitable phase relationship carried out by the sleeve 19, which is made integral with the cartridge 18 and is connected to the same shaft 10 through the key 20. The reference number 21 designates a cylindrical body, which is the support member for two differential (tripolar) magnetoresistive elements 25 and 26. The body 21 is made integral with the casing 11 and is provided with an annular projection 22 coupled to a corresponding annular projection 23 of the same casing for centering purposes. The magnetoresistive elements 25 and 26 are arranged in a ring 24 in a suitable phase relationship with the magnets 12 and 13.

The reference number 27 designates the lead which is connected to the positive pole of a D.C. source and to a first terminal of the magnetoresistive elements 25 and 26. The reference number 28 designates the lead which is connected to the negative pole of the samde D.C. source and to a second terminal of the magnetoresistive elements. The reference numbers 29 and 30 designate the leads, each of which is connected to a third terminal of the magnetoresistive elements and to the circuit which processes the signals delivered by the generator.

Figure 3:
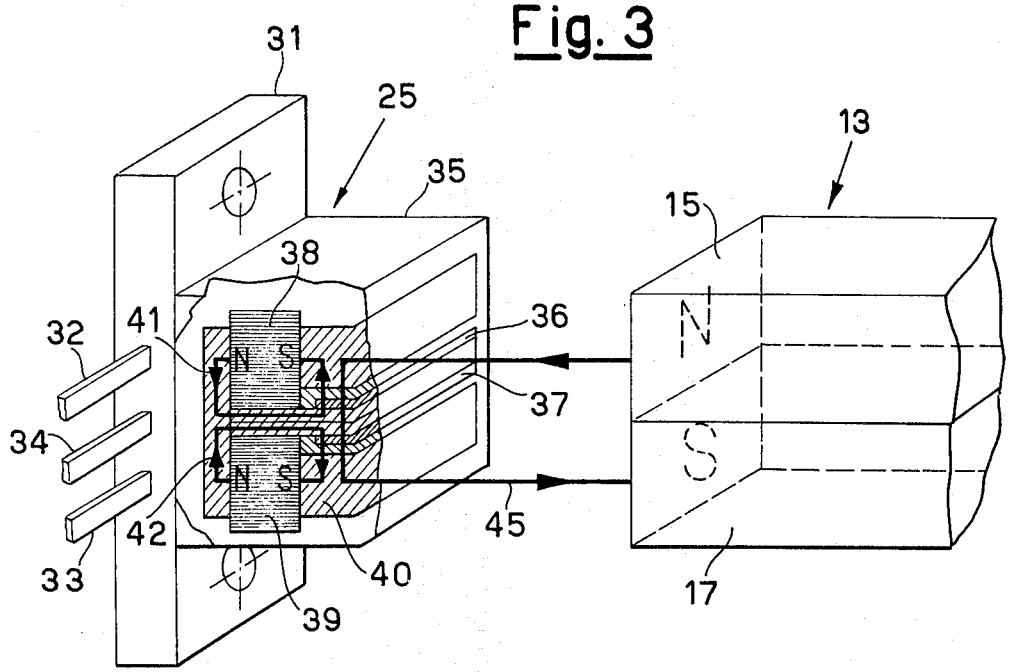
FIG. 3 shows some particulars of the components of FIG. 2.

For a better understanding of the operation of the above described generator, the magnetoresistive element 25 has been shown in FIG. 3 as partially sectioned and in enlarged scale. The magnetoresistive element comprises a base 31 and a block 35; the base 31 bears the three terminals 32, 33 and 34, which are to be connected to the leads 27, 28 and 29, respectively; the block 35 bears the magnetoresistive elements 36 and 37 and the permanent magnets 38 and 39.

The magnetoresistive elements 36 and 37 are serially connected between the terminals 32 and 33 and their common point is connected to the terminal 34. Each magnetoresistive element is affected by the magnetic field of the respective magnet, 38 or 39, being inserted in a side of the magnetic circuit 40, which is of the three columns and one yoke type. As appears from FIG. 3, the magnets 38 and 39 are arranged so that the produced magnetomotive forces are opposed to one another; the arrows 41 and 42 indicate the pattern of the magnetic induction flow lines of the field which influences each magnetoresistive element.

In the situation shown in FIG. 3 it has been assumed that the magnetoresistive element 25 is faced by the rotating magnet 13, which generates a field in which the magnetic induction flow lines are as indicated by the arrows 45; in the magnetoresistive element 36 the external magnetic field induces a polarization of opposite sense with respect to that of the internal magnetic field; in the magnetoresistive element 37 the external field induces a polarization of the same sense with respect to that of the internal field. It results that, as a consequence of the external field produced by the magnet 13, the resistance of the magnetoresistive element 36 decreases, whereas the resistance of the magnetoresistive element 37 increases.

Figure 4:
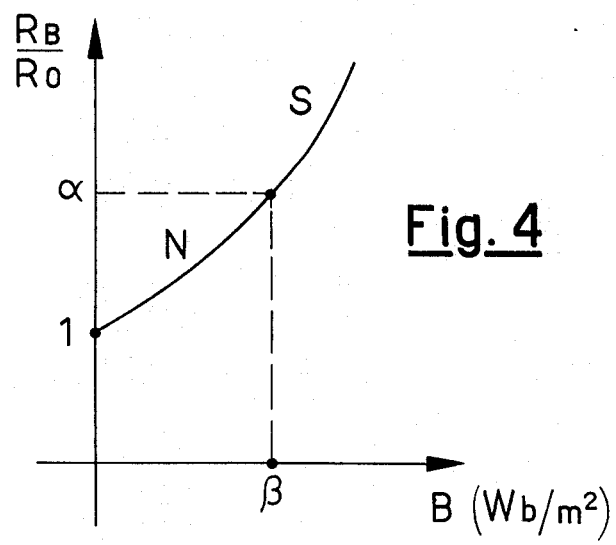
FIG. 4 is a graph, which shows the variation of the resistance of a differential magnetoresistive element as a function of the induction of the magnetic field which influences it.

In the graph of FIG. 4 the law of variation of the ratio of the resistance $R_B$ of the magnetoresistive element affected by the external magnetic field and the resistance $R_o$ of the same magnetoresistive element as only influenced by the internal magnetic fields (any external field being absent) is shown as a function of the magnetic induction which acts on the magnetoresistive element: a reduction of the magnetic induction which acts on a magnetoresistor, as it occurs when a North pole of a rotating magnet is aligned with the same magnetic resistor, causes its electric resistance to decrease, whereas an increase of the magnetic induction, as it occurs when a South pole of a rotating magnet is aligned with the magnetoresistor, causes its electric resistance to increase.

Therefore, when the magnet 12, whose pole pieces are inverted with respect to those of the magnet 13, appears in front of the magnetoresistive element 25, the resistance of the magnetoresistor 36 increases, whereas the resistance of the magnetoresistor 37 decreases.

As a result of the cyclic variations of the resistance of the magnetoresistors 36 and 37, the output voltage of the terminal 34 of the magnetoresistive element 25 cyclically varies: the voltage has an alternative wave form, which oscillates about a constant average value.

A signal of the same type is delivered by the magnetoresistive element 26, which operates in a manner similar to that of the element 25.

The two signals delivered by the magnetoresistive elements 25 and 26 are then processed in a circuit, which divides each signal into two distinct signals and simultaneously transforms the signals so as to allow their use in an apparatus for regulating an explosion engine to obtain the wanted information as to the rotating speed and the phase angle of the same engine.

Figure 5:
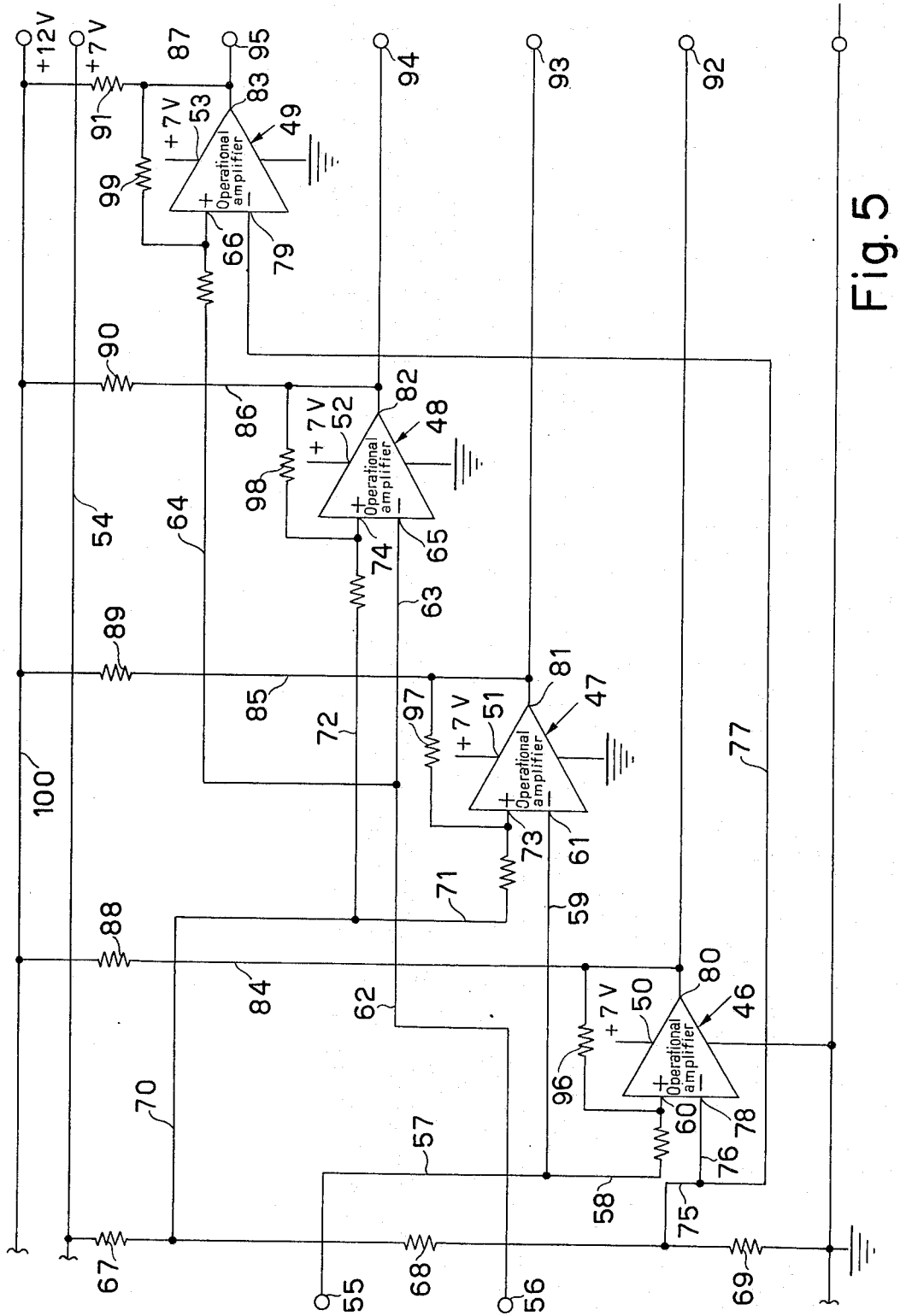
FIG. 5 shows a circuit for processing the signals produced by the generator.

The processing circuit as shown in FIG. 5 comprises four operational amplifiers 46, 47, 48 and 49, which act as switching tension comparators: the amplifiers are fed via the respective terminals 50, 51, 52 and 53 by the stabilized tension line 54; each amplifier is provided with two operational inputs: one is intended for the signal delivered by a magnetoresistive element of the generator, whereas the other one is intended for a reference signal formed by a tension of predetermined value.

The signals delivered by the generator are supplied to the processing circuit as inputs through the terminals 55 and 56, the first one being connected to the lead 29 and the second one to the lead 30 of the generator (see FIG. 2); the terminal 55 is in turn connected through the lead 57 and the parallely connected leads 58 and 59 to the input terminals 60 and 61 of the amplifiers 46 and 47; the terminal 56 is connected through the lead 62 and the parallely connected leads 63 and 64 to the input terminals 65 and 66 of the amplifiers 48 and 49.

Between the stabiized tension line 54 and ground there are inserted three serially connected resistors 67, 68 and 69, which allow to have two levels of tension; the first one consists of the tension downstream to the resistor 67, from whch the lead 70, which is connected through the parallely connected leads 71 and 72 to the input terminals 73 and 74 of the amplifiers 47 and 48, is shunted; the second level of the tension consists of the tension downstream to the resistor 68, from which the lead 75, which is connected through the parallely connected leads 76 and 77 to the input terminals 78 and 79 of the amplifiers 46 and 48, is shunted.

The output terminals 80, 81, 82 and 83 of the operational amplifiers 46, 47, 48 and 49 are each connected through a lead and a load resistor (84, 85, 86, 87 and 88, 89, 90, 91 respectively) to the supply line 100, which is connected to the D.C. source, and are obviously connected also to the output terminals 92, 93, 94, 95 of the processing circuit.

The feed-back resistors which are inserted between the output and input terminals of each amplifier are indicated by the reference numbers 96, 97, 98 and 99.

The amplifiers 46, 47, 48, 49 operate as tension comparing switches; the amplifiers continuously compare the two input tension signals, one being at a constant voltage of a predetermined value which acts as a reference signal and the other one being at an alternative voltage which oscillates about an average value, which is the signal to be processed. The cyclic oscillations of the second tension signal from values higher to values lower than the tension level of the reference signal cause the amplifier to switch and its output terminal goes from a high to a low tension potential, so that a train of positive sharp pulses is formed at the output of the amplifier.

Each signal to be processed is applied to two amplifiers: in one amplifier the signal is compared with a first reference signal having a tension level higher than its average value, whereas in the other one the signal is compared with a second reference signal having a tension level lower than its average value; therefore, the half waves of the alternative signal whose varying values are higher than the first reference level cause one amplifier to switch, whereas the half waves of the alternative signal whose varying values are lower than the second reference level cause the other amplifier to switch. The alternative signal is thus transformed into two trains of sharp pulses, which are angularly dephased to one another a suitable predetermined angle.

Figure 6:
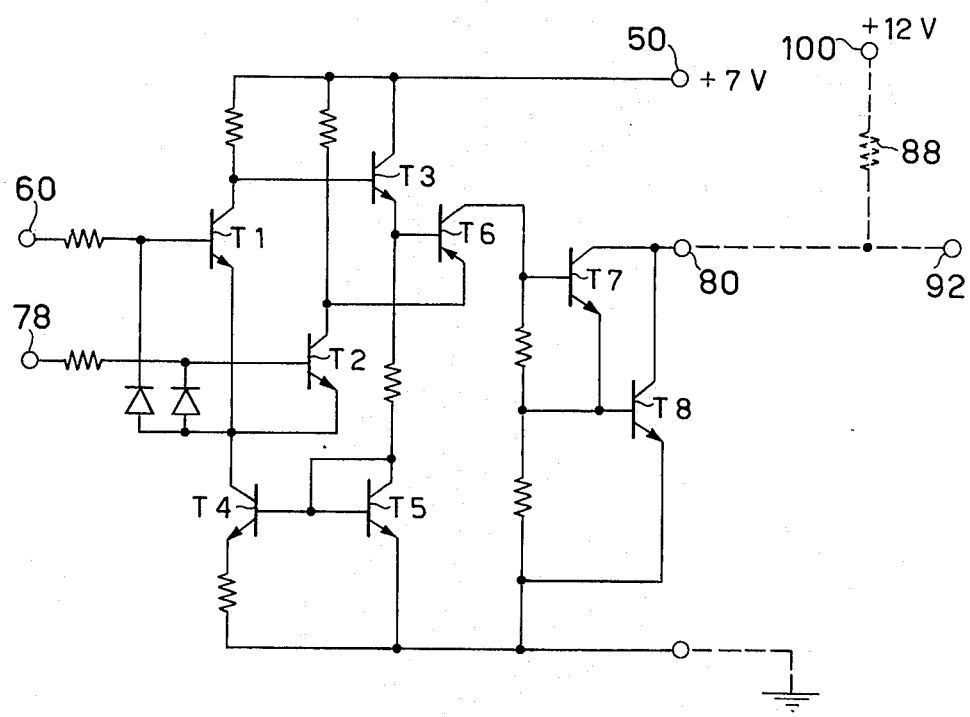
FIG. 6 shows the circuit diagram of a component of the circuit of FIG. 5.

In order that the invention is better understood, in FIG. 6 there is shown the circuit diagram of an operational amplifier used in the circuit of FIG. 5. Assume that the amplifier 46 is dealt with, bearing in mind that the other amplifiers operate in the same manner.

When the tension at the terminal 78 becomes higher than the tension at the terminal 60, i.e. the tension level of the reference signal is greater than the tension level of the signal delivered by the magnetoresistive element 25, the transistor $T_2$ switches on, whereas the transistor $T_1$ is off; therefore the transistor $T_3$ is on, as well as the transistors $T_4$ and $T_5$, whereas the transistor $T_6$ is off. As a consequence, the transistors $T_7$ and $T_8$ are off and the output terminal 80 of the amplifier 46, as well as the terminal 92 which is directly connected to the first one, is at the potential of the supply line 100.

On the contrary, when the tension of the terminal 78 is lower than the tension of the terminal 60, the transistors $T_1$ and $T_6$ are switched on, while the transistors $T_2$ and $T_3$ are switched off; the transistors $T_4$ and $T_5$ are still on and the transistors $T_7$ and $T_8$ switch on, so that the potential of the terminals 80 and 92 is lowered to the level determined by the drop voltage on the resistor 88.

As previously said, because of the cyclic switching of the amplifier between the two above said levels of tension, a train of positive sharp pulses is formed at the output terminal.

What is claimed is:

1. A pulse generator for providing information as to the speed of rotation and phase angle of an engine to an electronic apparatus for regulating the fuel feed to an internal combustion engine of the injection type, having a plurality of cylinders, comprising: a number of magnetosensitive switching devices formed by a number of magnetoresistive elements equal to the half of the number of the cylinders of the engine, said magnetoresistive elements being of differential tripolar type, formed by two magnetoresistors and by two permanent magnets, each of which is able to affect one magnetoresistor, means for producing a magnetic field for switching said magnetosensitive switching device mechanically connected to the main shaft so as to be rotated at a speed which is proportional to that of the mainshaft and with a preselected phase relationship with respect to said mainshaft, said field producing means being formed by two permanent magnets with pole pieces of suitable angular extension being arranged so as to have opposite magnetic polarities juxtaposed, said magnetic field periodically affecting said switching devices and causing their temporary switching with a duration and a frequency which are a function of the speed of rotation of the engine shaft and with a phase relationship which is a function of the phase relationship aforementioned, a circuit connected to said magnetoresistive elements for processing the signals delivered by said differential magnetoresistive elements, said circuit comprising at least one pair of amplifiers which operate as tension comparing switches, each amplifier being fed with a signal delivered by a magnetoresistive element and formed by an alternative tension which oscillates about an average value and with a reference signal formed by a tension of predetermined value, the amplifier being able to transform the first signal into a train of sharp pulses, the two reference signals which are fed to the amplifiers being formed by tensions of different values so that the two trains of pulses at the outputs of the two amplifiers are dephased of a suitable fixed angle.

* * * * *